United States Patent [19]
Willems et al.

[11] Patent Number: 6,142,404
[45] Date of Patent: Nov. 7, 2000

[54] COMPLIANT TAPE GUIDE WITH PLANAR STIFFNESS BODY FOR A DATA STORAGE TAPE CARTRIDGE

[75] Inventors: John D. Willems, Minneapolis; Daniel C. Egan, Oakdale; Douglas W. Johnson, Stillwater, all of Minn.; Leif O. Erickson, Riverfalls, Wis.

[73] Assignee: Imation Corp., Oakdale, Minn.

[21] Appl. No.: 09/192,828

[22] Filed: Nov. 16, 1998

[51] Int. Cl.$^7$ .................................................. G03B 23/02
[52] U.S. Cl. ............................................. 242/346; 360/132
[58] Field of Search ................................. 242/346, 346.1, 242/358, 615, 615.1, 615.3; 360/85, 95, 130.21, 130.22, 130.23, 130.32, 130.33, 132

[56] References Cited

U.S. PATENT DOCUMENTS

| | | |
|---|---|---|
| 3,831,882 | 8/1974 | Fitterer et al. . |
| 3,904,148 | 9/1975 | Cloud et al. ............................... 360/85 |
| 3,918,092 | 11/1975 | Rueger ................................. 242/615.1 |
| 3,984,039 | 10/1976 | Hawley et al. ............................ 226/97 |
| 4,466,582 | 8/1984 | Shiba . |
| 4,646,177 | 2/1987 | Sanford et al. ............................ 360/95 |
| 4,655,408 | 4/1987 | Gelardi et al. . |
| 4,697,759 | 10/1987 | Henderson et al. . |
| 5,155,639 | 10/1992 | Platter et al. .............................. 360/95 |
| 5,251,844 | 10/1993 | Albrecht et al. . |
| 5,297,755 | 3/1994 | Felde et al. . |
| 5,316,235 | 5/1994 | East et al. . |
| 5,377,927 | 1/1995 | Erickson et al. . |
| 5,511,302 | 4/1996 | Erickson et al. .......................... 29/521 |
| 5,513,815 | 5/1996 | Erickson et al. . |
| 5,519,562 | 5/1996 | Argumedo et al. ................. 360/130.21 |
| 5,547,142 | 8/1996 | Cheatham et al. .................... 242/338.1 |

OTHER PUBLICATIONS

D. E. Griffiths, "Continuous Compliant Tape Guide," *IBM Technical Disclosure Bulletin*, vol. 15, No. 8 (Jan. 1973).

S. T. Clegg et al., "Compliant Tape Guide," *IBM Technical Disclosure Bulletin*, vol. 25, No. 2 (Jul. 1982).

K. L. Smith et al., "Variable Spring–Rate Compliant Guide," *IBM Technical Disclosure Bulletin*, vol. 26, No. 8 (Jan. 1984).

W. O. Wightman, "Air Bearing Tape Guide," *IBM Technical Disclosure Bulletin*, vol. 27, No. 6 (Nov. 1984).

R. Andresen, "Tape Guide Design," *IBM Technical Disclosure Bulletin*, vol. 27, No. 7B (Dec. 1984).

"Compliant Guide Assembly With High Wear Resistance Contact Pads", *IBM Technical Disclosure*, vol. 29, No. 5 (Oct. 1986).

A. Delessio et al., "Parapet Air–Bearing With Gravity Button Tape Guides," *IBM Technical Disclosure Bulletin*, vol. 34, No. 9 (Feb. 1992).

*Primary Examiner*—Donald P. Walsh
*Assistant Examiner*—William A. Rivera
*Attorney, Agent, or Firm*—Eric D. Levinson

[57] ABSTRACT

A compliant tape guide having a compliant member with optimized planar stiffness. The compliant tape guide includes a top support plate, a bottom support plate, a bearing piece, the compliant member and a biasing member. The bearing piece extends between the top and bottom support plate in a generally perpendicular fashion. The compliant member is associated with an inner surface of the bottom support plate and includes a base, opposing legs, an edge receiving surface and a planar stiffness body. The opposing legs extend from the base. The edge receiving surface is attached to the opposing legs opposite the base to define an opening. The planar stiffness body is disposed within the opening and is configured to increase an in-plane stiffness of the compliant member in a plane substantially parallel to a plane of the base. Finally, the biasing member is associated with the compliant member to bias the edge receiving surface into engagement with a storage tape during use.

23 Claims, 4 Drawing Sheets

COMPLIANT TAPE GUIDE WITH PLANAR STIFFNESS BODY FOR A DATA STORAGE TAPE CARTRIDGE

BACKGROUND OF THE INVENTION

The present invention relates to a compliant tape guide for use with a data storage tape cartridge. More particularly, it relates to a compliant tape guide having a compliant member optimized for planar stiffness.

Data storage tape cartridges have been used for decades in the computer, audio and video fields. While other forms of media storage, such as diskettes are also available, the data storage tape cartridge continues to be an extremely popular form of recording large volumes of information for subsequent retrieval and use.

One type of data storage tape cartridge generally consists of an outer shell or housing maintaining at least one tape reel, a length of magnetic storage tape, and at least one tape guide. The storage tape is wrapped about and extends from the tape reel. The tape guide, in turn, articulates the storage tape through a defined tape path. In this regard, the tape path typically extends from the tape reel across a window portion (or read/write zone) of the housing. A door is normally associated with the window to provide selective access to the storage tape. During use, the data storage tape cartridge is inserted into a tape drive. The door is maneuvered into an open position and a transducer, such as a magnetic read/write head, engages the storage tape via the window. To ensure consistent, accurate engagement by the read/write head, the storage tape must be precisely positioned adjacent the window.

One common form of the data storage tape cartridge includes two tape reels. The storage tape extends between the two tape reels along a tape path defined by the tape guide. A driving system associated with the tape drive engages and directs movement of the tape reels to direct a desired portion of the storage tape to the cartridge window. Alternatively, the data storage tape cartridge may not have a tape guide. With this configuration, the tape drive itself will include a tape guide for directing the storage tape through a desired path.

With the two-reel design, the tape guide serves to define a tape path passing through the cartridge window. In this regard, the tape guide positions the storage tape within the cartridge window so as to be received by the read/write head. Any slight deviation from the desired planar positioning of the storage tape may result in reading/writing errors. If the storage tape is slightly above or below an expected location, upon insertion into the tape drive the read/write head will experience difficulties in finding a desired track on the storage tape. Similar problems occur if the tape path generates an angular orientation of the storage tape across the cartridge window. Additionally, the read/write head may encounter tracking problems whereby the head "loses" a desired track.

In light of the important role tape guides play in data storage tape cartridge performance, efforts have been made to improve upon tape guide design. One widely accepted form of a tape guide (or "compliant tape guide"), described in Erickson et al., U.S. Pat. No. 5,513,815, includes a top support plate, a bottom support plate, a bearing piece, a compliant member and a biasing member. The bearing piece extends between the top and bottom support plates to define a tape receiving surface generally perpendicular to the top and bottom support plates. The bearing piece is typically arcuate in form so as to direct the storage tape through a bend. Further, the bearing piece is normally disposed within an outer periphery of the top support plate and has a height slightly greater than a height of the storage tape. In this way, the non-magnetic side of the storage tape rides freely along the tape receiving surface of the bearing piece, while the outer periphery of the top support plate prevents an upper edge of the storage tape from disengaging the compliant tape guide. The compliant member, in turn, is configured to maintain a position (or height) of the storage tape relative to the top support plate.

More particularly, the compliant member includes a base, opposing legs and an edge receiving surface. The opposing legs extend from the base. The edge receiving surface is connected to the opposing legs opposite the base. The opposing legs allow the edge receiving surface to deflect relative to the base. With this in mind, the compliant member is connected to the bottom support plate such that the edge receiving surface extends beyond the tape receiving surface of the bearing piece. With this configuration, the edge receiving surface of the compliant member can engage a lower edge of the storage tape. Finally, the biasing member, which may include a plurality of spring-like fingers, is associated with the compliant member so as to bias or deflect the edge receiving surface toward the top support plate, in a plane substantially perpendicular to a plane of the storage tape.

During use, the compliant member guides the lower edge of the storage tape. This function is generally referred to as tape edge guiding. Notably, the compliant member is specifically designed to impart a known force on the lower edge of the storage tape. In other words, the opposing legs are configured to have a predetermined stiffness in a plane perpendicular to a plane of the top and bottom support plates (referred to as the "out-of-plane" stiffness). It is this stiffness that renders the overall tape guide "compliant." The edge receiving surface of the compliant member is "forced" into contact with the lower edge of the storage tape by the biasing member. However, the compliant member is not rigid so that the edge receiving surface can and will deflect slightly in response to movement of the storage tape. The predetermined out-of-plane stiffness provides a known force to the lower edge of the storage tape and therefore must be maintained within a relatively tight tolerance range so as to prevent damage to the storage tape.

The above-described compliant tape guide has proven to be highly successful in accurately directing and positioning storage tape within a data storage tape cartridge. The compliant member portion of the compliant tape guide enhances overall cartridge performance. Unfortunately, however, a potentially new problem may be created. While the out-of-plane stiffness of the compliant member is optimized to facilitate proper tape edge guiding, other cartridge vibrations may be generated. In particular, movement of the storage tape along the edge receiving surface of the compliant member, in conjunction with, and in response to, other internal vibrational sources, may cause the compliant member to vibrate in a plane substantially parallel to the plane of the top and bottom support plates (or substantially perpendicular to a plane of the storage tape). This is known as "in-plane" vibration. Under normal operating conditions, the in-plane vibration does not physically damage the storage tape or alter the tape path. However, where the vibration reaches a natural frequency of the compliant member, the compliant member may begin to resonate. This unexpected resonance of the compliant member may in turn be imparted onto the storage tape, resulting in excessive tape movement. When this occurs, the read/write head is unable to follow a servo signal track in the storage tape, causing a tape drive crash because the head is no longer able to follow the storage tape.

For example, it has been found that certain tape drives fail when an in-plane vibrational frequency of approximately 9 kHz on the compliant member was observed. It was determined that the standard design associated with the compliant member in question had an in-plane natural frequency of approximately 9 kHz. It is believed that the storage tape was maneuvered along and vibrated the edge receiving surface of the compliant member, and in response to other internal vibrational sources of the tape drive, the in-plane natural frequency of 9 kHz was reached, and the compliant member began to resonate, resulting in the above-described problem. Effectively then, at an in-plane vibrational frequency of 9 kHz, the compliant member portion of the compliant tape guide caused the tape drive to crash or fail by the head no longer being able to follow the storage tape.

Data storage tape cartridges are important tools used to maintain vast amounts of information. While the evolution of cartridge components, including storage tape and tape guides has greatly improved data storage tape cartridge capacity and performance, other unexpected problems have been identified. Therefore, a need exists for a compliant tape guide having a compliant member with a natural frequency different from an associated tape drive's operating frequency.

SUMMARY OF THE INVENTION

One preferred embodiment of the present invention provides a compliant tape guide for guiding a storage tape longitudinally through a tape path. The compliant tape guide includes a top support plate, a bottom support plate, a bearing piece, a compliant member and a biasing member. The bearing piece extends between the top and bottom support plates to define a tape receiving surface generally perpendicular to the top and bottom support plates. The tape receiving surface is sized to receive and longitudinally guide a storage tape. The compliant member and the biasing member are associated with the bottom support plate.

The compliant member includes a base portion, opposing legs, an edge receiving surface and a planar stiffness body. The opposing legs extend from the base portion. The edge receiving surface is attached to the opposing legs opposite the base and is sized to extend beyond the tape receiving surface of the bearing piece for engaging an edge of the storage tape. With this configuration, an opening is defined between the base portion, the opposing legs and the edge receiving surface. The planar stiffness body is disposed within the opening. Finally, the biasing member is associated with the compliant member to bias the edge receiving surface into engagement with an edge of the storage tape.

Upon final assembly, the compliant tape guide serves to articulate the storage tape through a longitudinal tape path as defined by the tape receiving surface of the bearing piece. The edge receiving surface of the compliant member provides tape edge guidance. Importantly, the planar stiffness body increases an in-plane stiffness of the compliant member, as otherwise defined by the opposing legs. At the same time, however, the planar stiffness body preferably does not affect a predetermined out-of-plane stiffness of the compliant member. Thus, the compliant member, in combination with the biasing member, provides a desired out-of-plane spring rate onto an edge of the storage tape for acceptable tape edge guidance. However, because the in-plane stiffness, and thus the natural in-plane frequency, is greatly increased, the compliant member will not resonate under normal operating conditions.

Another aspect of the present invention relates to an improved compliant member of a compliant tape guide. The compliant tape guide is for use with a data storage tape cartridge including a longitudinally driven storage tape. The compliant member includes a base, opposing legs extending from a side of the base and an edge receiving surface attached to the opposing legs opposite the base. With this configuration, an opening is defined between the base, the opposing legs and the edge receiving surface. The compliant member has a predetermined out-of-plane deflection stiffness, defined by deflection of the edge receiving surface in a plane generally perpendicular to a plane of the base for facilitating engagement of the edge receiving surface with an edge of the storage tape. With this in mind, the improved compliant member comprises a planar stiffness body disposed within the opening. The planar stiffness body is configured to limit in-plane vibration of the compliant member, as defined by deflection of the edge receiving surface in a plane generally parallel to the plane of the base. In one preferred embodiment, the improved compliant member is configured such that the predetermined out-of-plane deflection stiffness is maintained. In a further preferred embodiment, the planar stiffness body includes an arm extending between the base and one of the opposing legs.

Yet another aspect of the present invention relates to a method for altering an in-plane stiffness of a compliant member portion of a compliant tape guide for use with a longitudinally driven storage tape articulated through a tape path defined by the compliant tape guide. The compliant member includes a base, opposing legs extending from a side of the base, and an edge receiving surface attached to the opposing legs opposite the base. With this configuration, an opening is defined between the base, the opposing legs and the edge receiving surface. The edge receiving surface is sized to engage an edge of the storage tape. The opposing legs of the compliant member are configured to have a predetermined out-of-plane stiffness for directing the edge receiving surface into engagement with an edge of the storage tape upon final assembly of the compliant tape guide. The method for altering the in-plane stiffness includes disposing a planar stiffness body within the opening of the compliant member. In one preferred embodiment, the planar stiffness body is configured to increase the in-plane stiffness of the compliant member.

Yet another aspect of the present invention relates to a method for optimizing performance of a data storage tape cartridge within a tape drive. The data storage tape cartridge includes a housing, at least one tape reel disposed within the housing, a storage tape extending from the tape reel and a compliant tape guide for directing movement of the storage tape. The compliant tape guide includes a compliant member having an edge receiving surface configured to engage and direct an edge of the storage tape during operation of the data storage tape cartridge. The method includes determining an in-plane resonance frequency of the compliant member. A determination is then made as to whether the tape drive has an operating frequency approaching the in-plane natural frequency. If so, the in-plane stiffness, and thus the in-plane natural frequency, of the compliant member is altered to a new in-plane resonance frequency that is different from the operating frequency such that operation of the tape drive will not cause the compliant member to resonate.

DETAILED DESCRIPTION OF THE PREFERRED EMBODIMENTS

Figure 1:
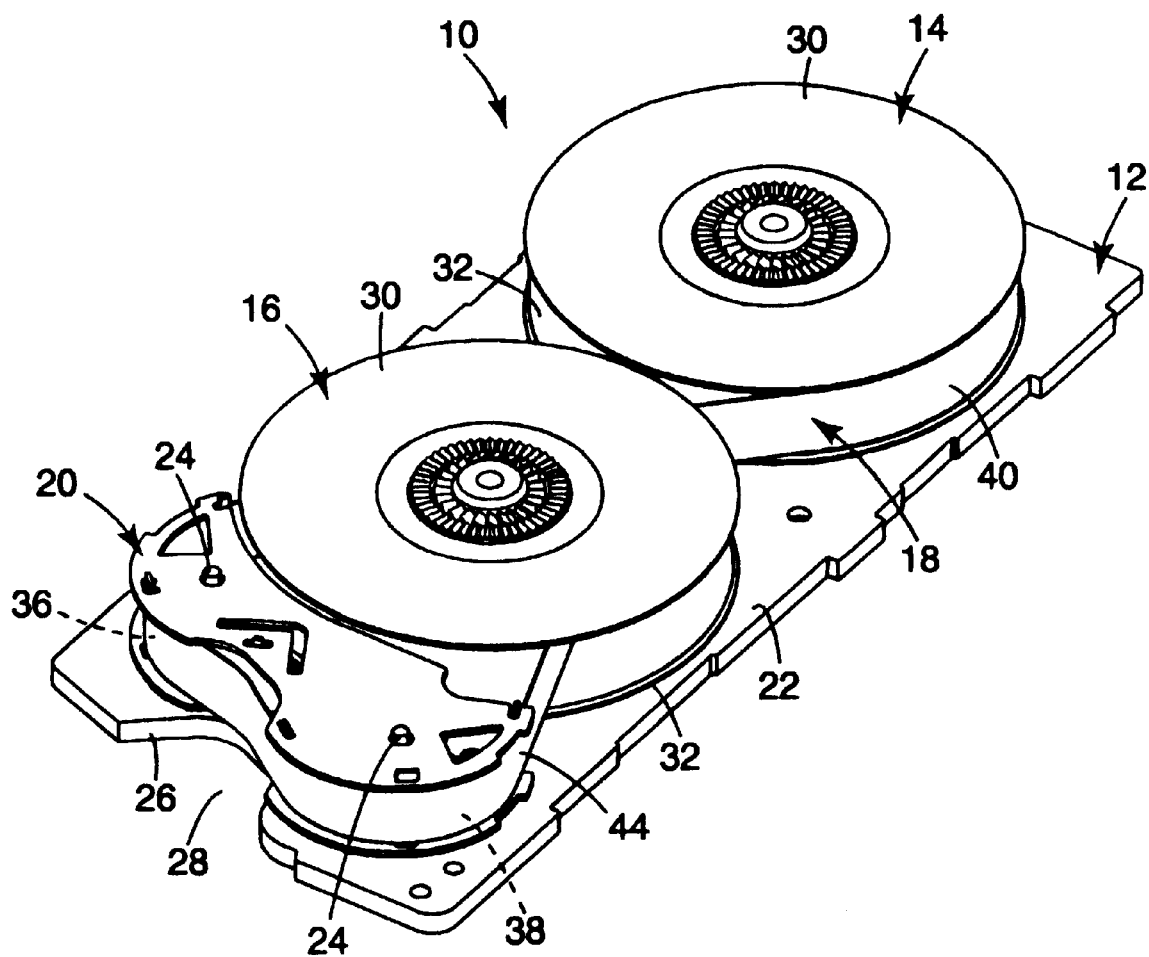
FIG. 1 is a perspective view of a data storage tape cartridge in accordance with the present invention with a cover and door portion removed.

One preferred embodiment of a data storage tape cartridge 10 is shown in FIG. 1. Generally speaking, the data storage tape cartridge 10 includes a base plate 12, a cover (not shown), a door (not shown), a first tape reel 14, a second tape reel 16, a storage tape 18 and a compliant tape guide 20. For ease of illustration, the data storage tape cartridge 10 is shown with the cover and the door removed. The first tape reel 14 and the second tape reel 16 are rotatably maintained by respective hub pins (not shown) extending from an interior surface 22 of the base plate 12. The compliant tape guide 20 is secured to the interior surface 22 of the base plate 12 by pins 24. As described in greater detail below, the storage tape 18 extends between the first tape reel 14 and the second tape reel 16, along a portion of the compliant tape guide 20. Examples of a data storage tape cartridge, including a cover, is provided in Erickson et al., U.S. Pat. No. 5,513,815, the teachings of which are incorporated herein by reference.

The base plate 12 is configured to mate with the cover (not shown) to define a protective enclosure within which various other components of the data storage tape cartridge 10 are maintained. The base plate 12 is preferably an integral structure and includes a recess 26. The recess 26 coincides with a reciprocal opening in the cover (not shown) to define a read/write zone 28 through which the storage tape 18 can be accessed by a read/write head (not shown). To this end, the data storage tape cartridge 10 preferably includes the door (not shown) secured to the cover in a hinged fashion. The door can be selectively moved to provide access to the storage tape 18 at the read/write zone 28.

The base plate 12 is made of a relatively rigid material, preferably aluminum. Alternatively, other rigid materials, such as stainless steel, may also be used. In the preferred embodiment, the base plate 12 is formed by a stamping process, although other manufacturing techniques are also available.

The first and second tape reels 14, 16 are virtually identical and are positioned to rotate relative to the base plate 12 about the respective hub pins (not shown). Each of the first and second tape reels 14, 16 includes a central hub (not shown), an upper flange 30, a lower flange 32 and a toothed exterior surface 34. The upper flange 30 and the lower flange 32 are secured to opposite ends of the central hub and are spaced in accordance with a height of the storage tape 18. The toothed exterior surface 34 is formed as an axial extension of the central hub above the upper flange 30. During use, a portion of the tape drive (not shown) engages the toothed exterior surfaces 34 for controlled rotation of the first and second tape reels 14, 16. In a preferred embodiment, the tape reels 14, 16 are made of plastic.

The storage tape 18 is preferably a magnetic tape of a type commonly known in the art. For example, the storage tape 18 may consist of a balanced polyethylene naphthalate (PEN) based material coated on one side with a layer of magnetic material dispersed within a suitable binder system, and on the other side with a conductive material dispersed in a suitable binder system. Various tracks (not shown) are normally defined along a head interface (or outer) surface of the storage tape 18. Information can be recorded and read from each track. One of these tracks typically includes a servo signal for guiding movement of the read/write head (not shown). Acceptable magnetic tape is available, for example, from Imation Corp. of St. Paul, Minn.

The compliant tape guide 20 is described in greater detail below. Generally speaking, however, the compliant tape guide 20 is positioned proximate the recess 26 in the base plate 12 and defines a first arcuate surface 36 (shown in FIG. 1 as hidden by the storage tape 18) and a second arcuate surface 38 (shown in FIG. 1 as hidden by the storage tape 18). The first and second arcuate surfaces 36, 38 are configured to direct or guide the storage tape 18 in a relatively planar fashion through the read/write zone 28 defined by the base plate 12.

As shown in FIG. 1, the above components combine to define a longitudinal tape path for the storage tape 18. In particular, the storage tape 18 extends from the first tape reel 14 and articulates around the first arcuate surface 36 and the second arcuate surface 38 of the compliant tape guide 20. Notably, the compliant tape guide 20 maintains a planar positioning of the storage tape 18 in the read/write zone 28. From the second arcuate surface 38, the storage tape 18 extends to and is wrapped around the second tape reel 16. It will recognized by one of skill in the art that the tape path depicted in FIG. 1 is but one of many available designs. By incorporating different tape guides at varying locations, the resulting tape path may be substantially different from that shown in FIG. 1. So long as the storage tape 18 extends in a planar fashion at the read/write zone 28, the benefits of the present invention will be realized.

As should be evident from the above description, regardless of the exact tape path, the compliant tape guide 20 is in constant contact with the storage tape 18 during use. In this regard, portions of the compliant tape guide 20 contact or "guide" the storage tape 18 along an inner face 40, an upper edge 42 and a lower edge 44. By guiding the storage tape 18 along the inner face 40, the compliant tape guide 20 maintains the storage tape 18 generally perpendicular to a plane of the base plate 12. This perpendicular relationship is referred to as the "out-of-plane" orientation. Conversely, as described in greater detail below, portions of the compliant tape guide 20 intermittently contact both the upper edge 42 and the lower edge 44 of the storage tape 18. This interface constrains the upper edge 42 and the lower edge 44 to a particular height or location in a plane generally parallel to that of the base plate 12. This parallel positioning is referred to as the "in-plane" orientation. By maintaining the out-of-plane and in-plane positioning of the storage tape 18, a tape drive head (not shown) will consistently engage the storage tape 18 and the associated tracks, via the read/write zone 28, at a known location. One embodiment of compliant tape guide configured to facilitate proper positioning is shown in FIG. 2.

Figure 2:
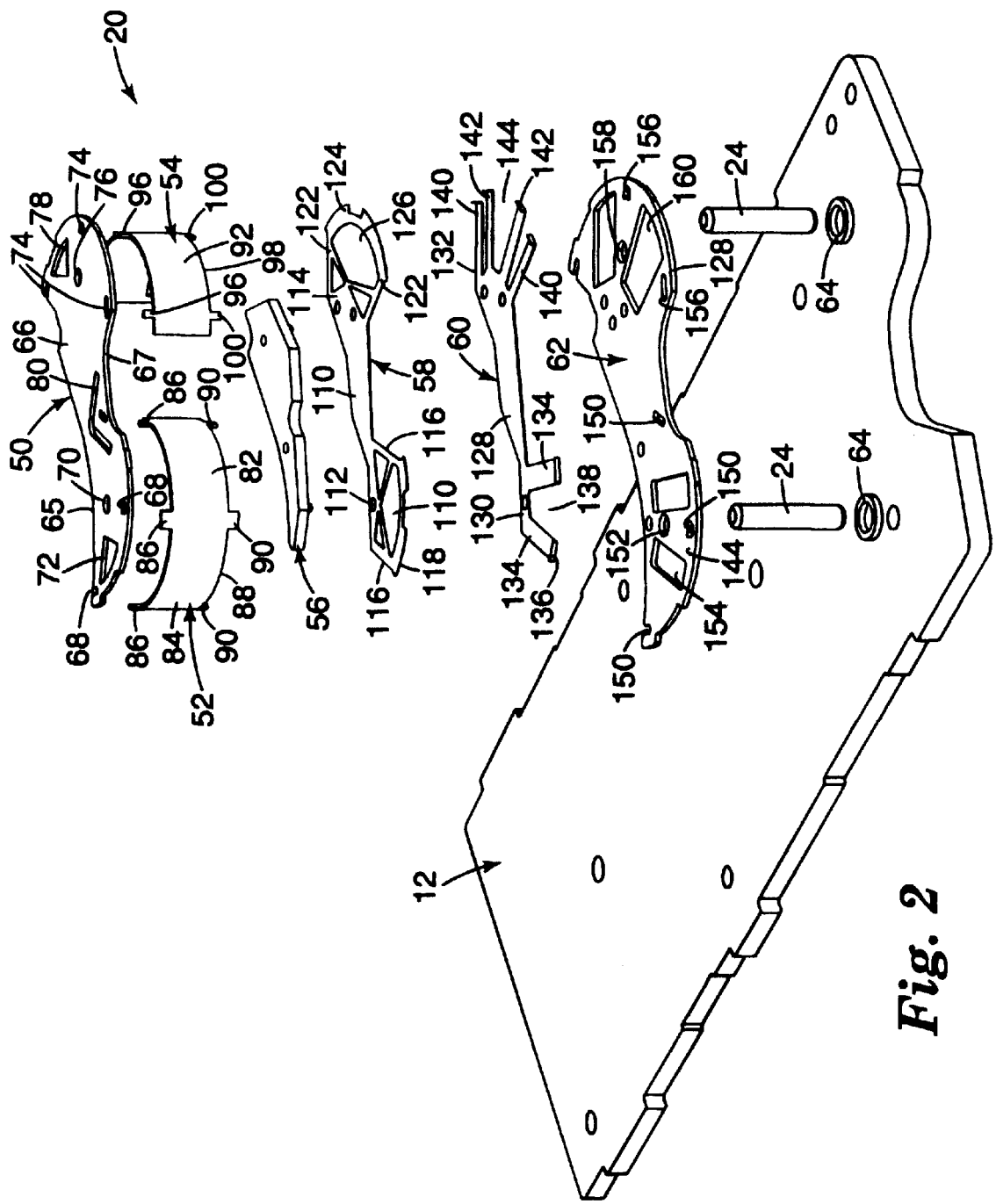
FIG. 2 is an exploded view of a compliant tape guide of the data storage tape cartridge in accordance with the present invention.

FIG. 2 provides an exploded of one embodiment of the compliant tape guide 20. The compliant tape guide 20 includes a top plate 50, a first bearing piece 52, a second bearing piece 54, a clamp plate 56, a compliant member 58, a biasing member 60, a bottom support plate 62, the pins 24 and spacers 64. The first and second bearing pieces 52, 54 are secured to and extend from the top support plate 50. The clamp plate 56 secures the compliant member 58 and the biasing member 60 to the bottom support plate 62. The bottom support plate 62 receives and maintains a lower portion of each of the first and second bearing pieces 52, 54. Finally, the pins 24 and the spacers 64 secure the entire assembly to the base plate 12. As used throughout this specification, directional terminology such as "upward," "downward," "vertical," "horizontal," "top," "bottom," etc. are used with reference to the orientation of the particular figure being described. It should be understood that use of these terms is for clarity only, and that the data storage tape cartridge 10, and thus any of its components, may actually be oriented in any direction relative to the world in general. As such, these terms are not meant to serve as limitations.

As described in greater detail below, the compliant tape guide 20 provides a unitary structure securable to the base plate 12 such that the bearing pieces 52, 54 are disposed on opposite sides of the read/write zone 28. Notably, the first and second bearing pieces 52, 54 form the first and second arcuate surfaces 36, 38 (FIG. 1), respectively. Since the bearing pieces 52, 54 are connected as part of a single module or structure, tolerance build-up is minimized. In particular, the tape path length, as measured along the upper and lower edges 42, 44 (FIG. 1) of the storage tape 18 (FIG. 1), is approximately the same, so that lateral and longitudinal tape tension is generally consistent. Design of the compliant tape guide 20 additionally facilitates tilt-alignment with the base plate 12.

The top support plate 50 is preferably an integrally formed body stamped from non-magnetic stainless steel stock. Alternatively, other relatively rigid, non-magnetic materials may also be useful. The top support plate 50 is defined by a first section 65, a second section 66, and an outer periphery 67. In this regard, the top support plate 50 includes three slots 68, an opening 70 and a relief cut-out 72 at the first section 65. Additionally, three slots 74, an opening 76 and a relief cut-out 78 are formed at the second section 66. Finally, the top support plate 50 includes a relief cut-out 80 at a central portion thereof. As described in greater detail below, the two sets of three slots 68, 74 are positioned slightly within the outer periphery 67 and are sized to receive and maintain portions of the first and second bearing pieces 52, 54, respectively. Each of the openings 70, 76 are sized to receive and maintain one of the pins 24. Finally, the relief cut-outs 72, 78, 80 are provided to distribute pressure more uniformly across the top support plate 50.

The first and second bearing pieces 52, 54 are virtually identical and are preferably stamped from non-magnetic stainless steel stock. It should be recognized, however, that a variety of other rigid materials may alternatively be employed. The first bearing piece 52 defines a tape receiving surface 82 and includes a top edge 84 having three tabs 86, and a bottom edge 88 having three tabs 90. Similarly, the second bearing piece 54 defines a tape receiving surface 92 and includes a top edge 94 having three tabs 96 (two of which are depicted in FIG. 2), and a bottom edge 98 having three tabs 100. It will be understood that the number of tabs may vary and the disclosed embodiment in no way limits the scope of the invention. The first and second bearing pieces 52, 54 are preferably formed by a cold rolling process, such that the respective tape receiving surfaces 82, 92 are arcuate or concave.

The clamp plate 56 is preferably an integral body configured to secure the compliant member 58, the biasing member 60 and the bottom support plate 62 as a singular assembly. To this end, the clamp plate 56 is preferably made of a rigid, non-magnetic material, such as aluminum or stainless steel. For reasons made clear below, the clamp plate 56 must be sized so as to not interfere with a desired deflection of portions of the compliant member 58 or passage of the pins 24.

The compliant member 58 is described in greater detail below. Generally speaking, however, the compliant member 58 is a relatively flat body, preferably machine stamped from non-magnetic stainless steel. The compliant member 58 includes a base 110, a first compliant portion 112 (referenced generally in FIG. 2) and a second compliant portion 114 (referenced generally in FIG. 2). The first compliant portion 112 includes opposing legs 116 extending from the base 110 and an edge receiving surface 118 connected to the opposing legs 116 opposite the base 110. With this configuration, an opening 120 is defined between the base 110, the opposing legs 116 and the edge receiving surface 118. Similarly, the second compliant portion 114 includes opposing legs 122 extending from the base 110 and an edge receiving surface 124 connected to the opposing legs 122 opposite the base 110. With this configuration, an opening 126 is defined between the base 110, the opposing legs 122 and the edge receiving surface 124. The opposing legs 116, 122 are configured to allow the respective edge receiving surface 118, 124 to deflect relative to the base 110.

The biasing member 60 is preferably stamped from non-magnetic stainless steel and includes a central portion 128, a first biasing portion 130 and a second biasing portion 132. In a preferred embodiment, the first biasing portion 130 includes a plurality of fingers 134 extending from the central portion 128. Each of the plurality of fingers 134 terminates in a flange 136 and are spaced to define a gap 138. The second biasing portion 132 similarly includes a plurality of fingers 140 extending from the central portion 128, each terminating in a flange 142. The plurality of fingers 140 are spaced to define a gap 144. Each of the plurality of fingers 134, 140 are sized in accordance with the compliant member 58. More particularly, each of the plurality of fingers 134, 140 is sized such that the flanges 136, 142 extend slightly beyond the respective edge receiving surface 118, 124 upon assembly of the compliant member 58 to the biasing member 60. Due to the preferred stamp manufacturing process for the biasing member 60, each of the plurality of fingers 134, 140 is configured to apply an upward force (relative to the direction of FIG. 2) biasing the respective edge receiving surface 118, 124 toward the top support plate 50.

The bottom support plate 62 is highly similar to the top support plate 50. Thus, the bottom support plate 62 is preferably an integral body stamped from non-magnetic stainless steel stock and defines a first section 144, a second section 146 and an outer periphery 148. The first section 144 includes three slots 150, an opening 152 and a relief cut-out 154; and the second section 146 includes three slots 156, an opening 158 and relief cut-out 160. The respective slots 150, 156 are positioned slightly within the outer periphery 148 and are sized to receive the respective tabs 90, 100 of the first and second bearing pieces 52, 54. The openings 152, 158 are sized to receive the pins 24. Finally, the relief cut-outs 154, 160 are provided to distribute pressure more uniformly across the bottom support plate 62.

The compliant tape guide plate 20 is assembled substantially as follows. The compliant member 58 and the biasing member 60 are secured to the bottom support plate 62 by the clamp plate 56. As shown in FIG. 2, the clamp plate 56 is aligned with the base 110 of the compliant member 58 and the central portion 128 of the biasing member 60. Assembly of the clamp plate 56, the compliant member 58, the biasing member 60 and the bottom support plate 62 may be achieved in a variety of fashions, such as by including protrusions on the clamp plate 56 sized to pass through and engage respective openings in the compliant member 58, the biasing member 60 and the bottom support plate 62, thereby providing a frictional fit. Additionally, an adhesive may be used to ensure that the various components are sufficiently secured to one another. According the preferred assembly, the biasing member 60 rests on top of the bottom support plate 62, and the compliant member 58 is secured on top of the biasing member 60. With this orientation, the first biasing portion 130 of the biasing member 60 engages the first compliant portion 112 of the compliant member 58. Similarly, the second biasing portion 132 engages the second compliant portion 114. For example, the plurality of fingers 134 of the first biasing portion 130 extend beyond and engage the edge receiving surface 118 of the first compliant portion 112, biasing the edge receiving surface 118 upwardly (relative to the orientation of FIG. 2) via deflection of the opposing legs 116. Similarly, the plurality of fingers 140 of the second biasing portion 132 extend beyond and engage the edge receiving surface 124 of the second compliant portion 114, again resulting in an upward bias via deflection of the opposing legs 122. Notably, the clamp plate 56 reinforces the base 110 of the compliant member 58, thereby providing a relatively rigid pivot point for the opposing legs 116, 122.

The first and second bearing pieces 52, 54 are then secured to the top support plate 50. More particularly, the first bearing piece 52 is positioned such that the three tabs 86 of the top edge 84 frictionally engage the three slots 68 of the first section 65 of the top support plate 50. Similarly, the second bearing piece 54 is orientated such that the three tabs 96 of the top edge 94 frictionally engage the three slots 74 of the second section 66 of the top support plate 50. As shown in FIG. 2, then, the first and second bearing pieces 52, 54, and in particular the respective tape receiving surfaces 82, 92, extend in a generally perpendicular fashion from a plane of the top support plate 50.

The first and second bearing pieces 52, 54 are then assembled to the bottom support plate 62. For example, the three tabs 90 of the first bearing piece 52 are frictionally received within the associated slots 150 of the first section 144 of the bottom support plate 62. Similarly, the three tabs 100 of the second bearing piece 54 are frictionally maintained within the three slots 156 of the second section 146. With this construction, similar to the top support plate 50, the first and second bearing pieces 52, 54, and in particular the respective tape receiving surfaces 82, 92, are substantially perpendicular to a plane of the bottom support plate 62.

The above-described assembly is then secured to the base plate 12 via the pins 24 and the spacers 64. In this regard, it should be recognized that the compliant tape guide 20 provides an unobstructed passage for each of the pins 24 between the bottom support plate 62 and the top support plate 50. For example, a first one of the pins 24, otherwise assembled to the base plate 12, extends from the opening 152 in the first section 144 of the bottom support plate 62, through the gap 138 in the first biasing portion 130 of the biasing member 60, the opening 120 in the first compliant portion 112 of the compliant member 58, between the clamp plate 56 and the first bearing piece 52, and to the opening 70 in the first section 65 of the top support plate 50. The gap 144 in the biasing member 60 and the opening 126 in the compliant member 58 facilitate passage of a second one of the pins 24 from the bottom support plate 62 to the top support plate 50. The spacers 64 may be included to position the bottom support plate 62 at a desired height relative to the base plate 12.

Regardless of whether the spacers 64 are employed, the compliant tape guide 20 is mounted to the base plate 12 such that the top and bottom support plates 50, 52 are substantially parallel with a plane of the base plate 12, whereas the tape receiving surfaces 82, 92 of the first and second bearing pieces 52, 54, respectively, are substantially perpendicular to a plane of the base plate 12. During use, then, the tape receiving surfaces 82, 92 of the respective first and second bearing pieces 52, 54 maintain the storage tape 18 (FIG. 1) in a plane substantially perpendicular to a plane of the base plate 12. Conversely, the compliant member 58 and the top support plate 50 define and maintain a height of the storage tape 18 relative to the interior surface 22 of the base plate 12. As the storage tape 18 maneuvers along the first and second bearing pieces 52, 54, the lower edge 44 (FIG. 1) of the storage tape 18 engages the edge receiving surfaces 118, 124 of the compliant member 58. The biasing member 60 biases or deflects the respective edge receiving surfaces 118, 124 upwardly toward the top support plate 50. As a result, the compliant member 58 defines a distance between the lower edge 44 of the storage tape 18 and the interior surface 22 of the base plate 12, and serves as a tape edge guide. Notably, the biasing member 60 and the compliant member 58 are configured to allow a downward deflection of the edge receiving surfaces 118, 124, thereby allowing a slight downward movement of the storage tape 18 to avoid damaging the lower edge 44. The bottom support plate 62, and in particular the outer periphery 148, acts as a lower limit to this deflection such that the lower edge 44 of the storage tape 18 cannot disengage or ride off of the compliant tape guide 20. The top support plate 50 performs a similar function in that an inner edge of the top support plate 50 between the outer periphery 66 and the respective bearing pieces 52, 54 prevents the upper edge 42 (FIG. 1) of the storage tape 18 from disengaging the compliant tape guide 20.

The compliant member 58 serves an important role in achieving proper tape alignment and guidance. However, certain inherent characteristics of the compliant member 58 may contribute to certain tape drive errors. This characteristic is best described with reference to a prior art compliant member 170 depicted in FIG. 3. Similar to the compliant member 58 (FIG. 2) previously described, the prior art compliant member 170 includes a base 172, a first compliant portion 174 (identified with a dashed circle) and a second compliant portion 176 (identified with a dashed circle). Each of the first and second compliant portions 174, 176 includes opposing legs 178 extending from the base 172 and an edge receiving surface 180 attached to the opposing legs 178 opposite the base 172. These components combine to define an opening 182 at each of the first and second compliant portions 174, 176. As a point of reference, arrows are provided on each of the edge receiving surfaces 180 of the first and second compliant portions 174, 176 to depict the direction of tape travel.

Figure 3:
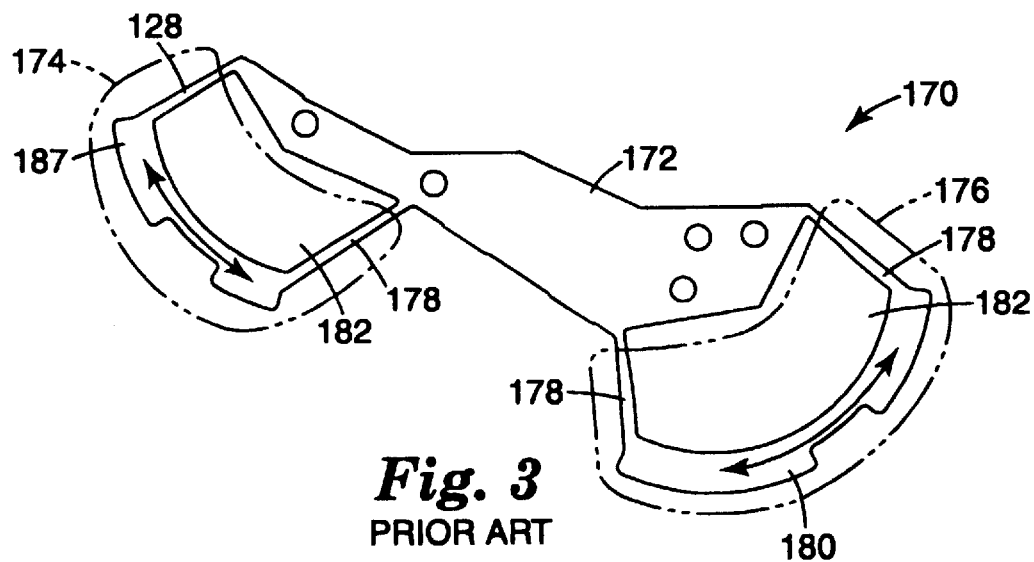
FIG. 3 is an enlarged, top view of a prior art compliant member.

As previously described, each of the first and second compliant portions 174, 176 are configured such that the edge receiving surface 180 can be biased and will deflect to engage the lower edge 44 (FIG. 1) of the storage tape 18 (FIG. 1). With reference to FIG. 3, then, the opposing legs 178 are configured to deflect in a direction generally perpendicular to a plane of the base 172, pivoting relative to the base 172. This deflection direction is generally referred to as the "out-of-plane" deflection in that the edge receiving surface 180 deflects in a direction perpendicular to the plane of the base 172 (or the plane of the paper of FIG. 3). While the opposing legs 178 facilitate out-of-plane deflection, they are manufactured to have a certain predetermined resistance to this motion. Effectively then, the opposing legs 178 have a known out-of-plane stiffness. Notably, the term "out-of-plane" is relative to both the plane of the compliant member 170, as well as the plane of the base plate 12 (FIG. 2) previously described, because upon final assembly the compliant member 170 and the base plate 12 are parallel. As an additional point of reference, "out-of-plane" deflection of the edge receiving surface is in a plane substantially perpendicular to a plane of the storage tape 18 (FIG. 1).

In addition to the out-of-plane stiffness, the opposing legs 178 also provide an in-plane stiffness. The in-plane stiffness relates to deflection of the opposing legs 178, and thus of the edge receiving surface 180, in a plane parallel to the plane of the base 172 (or the plane of the paper of FIG. 3). Notably, the term "in-plane" is relative to both the plane of the compliant member 170, as well as the plane of the base plate 12 (FIG. 2) previously described. As the storage tape 18 (FIG. 1) engages and travels along the edge receiving surface 180, a frictional interaction between the storage tape 18 and the edge receiving surface 180 causes the edge receiving surface 180 to deflect slightly in a plane parallel to the plane of the base 172 (in-plane deflection). The opposing legs 178 allow a slight in-plane deflection before the internal in-plane stiffness of the opposing legs 178 forces the edge receiving surface 180 back to the position shown in FIG. 3. Over time, as the storage tape 18 continuously moves along the edge receiving surface 180, the edge receiving surface 180 will move back-and-forth between an in-plane deflection position and the position of FIG. 3. At a certain frequency, this in-plane movement will approach an in-plane natural or resonant frequency of the first and/or second compliant portion 174 or 176, resulting in resonance. Other components of the data storage tape cartridge 10 (FIG. 2) and the operational frequency of the tape drive (not shown) may contribute to the in-plane resonance of the compliant member 170. The in-plane resonance of the compliant member 170 is resultingly imparted onto the storage tape 18, causing the storage tape 18 to move excessively. The read/write head (not shown) otherwise following the servo track on the storage tape 18 cannot follow this unexpected tape movement, causing a drive failure.

Where the particular tape drive does not cause the storage tape 18 (FIG. 1) to travel at a rate sufficient to impart an in-plane frequency on the compliant member 170 approximating the natural (or resonant) frequency and/or does not have an operational frequency approximating the resonant frequency, the above-described resonance problems will not occur. Experiments have, however, identified in-plane resonance as a problem. For example, a data storage tape cartridge having a compliant tape guide utilizing the compliant member 170 shown in FIG. 3 was found to resonate at an in-plane frequency of 9 kHz. At this in-plane frequency, tape drive failure occurred. It should be noted that the first and second compliant portions 174, 176 may have different resonant frequencies.

The present invention overcomes the above-described in-plane resonance problem by altering the in-plane stiffness of the prior art compliant member 170. An enlarged view of one preferred embodiment of the compliant member 58 is provided in FIG. 4. As previously described, the compliant member 58 is generally comprised of the base 110, the first compliant portion 112 (identified with a dashed circle) and the second compliant portion 114 (identified with a dashed circle). The first compliant portion 112 includes the opposing legs 116 and the edge receiving surface 118, the combination of which forms the opening 120. Similarly, the second compliant portion 114 includes the opposing legs 122 and the edge receiving surface 124 that combine with the base 110 to define the opening 126. Additionally, the first and second compliant portions 112, 114 each include a planar stiffness body 190, 192 disposed within the respective opening 120, 126.

The planar stiffness bodies 190, 192 are preferably integrally formed with the compliant member 58, such as during the stamping process. The planar stiffness bodies 190, 192 are configured to greatly increase or otherwise alter the in-plane stiffness of the respective compliant portion 112, 114. Accordingly, the natural (or resonant) frequency of the first and second compliant portions 112, 114 is also increased (relative to the natural in-plane frequency of the prior art compliant member 170 shown in FIG. 3). In a preferred embodiment, the "new" resonant frequency of the compliant portions 112, 114 is much greater than the operational frequency of an associated tape drive (not shown) such that the first and second compliant portions 112, 114 will not resonate under normal operating conditions.

In a preferred embodiment, the planar stiffness bodies 190, 192 are an opposing pair of arms. For example, the planar stiffness body 190 of the first compliant portion 112 includes a first arm 194 and a second arm 196. The first arm 194 extends from the base 110 and is attached to one of the opposing legs 116. The second arm 196 similarly extends from the base 110, and is connected to an opposite one of the opposing legs 116. The second compliant portion 114 similarly includes a first arm 198 and a second arm 200, each of which extend from the base 110 in a symmetrical fashion and are connected to one of the opposing arms 122. In one preferred embodiment, each of the arms 194, 196, 198, 200 extends centrally from the base 110 so as to optimize the effect on in-plane stiffness, although other locations are equally acceptable. Similarly, while FIG. 4 depicts the arms 194, 196, 198, 200 as bisecting a respective one of the opposing legs 116, 122, other locations are equally acceptable.

Importantly, the first and second compliant portions 112, 114 are preferably configured such that inclusion of the planar stiffness bodies 190, 192 does not alter the predetermined out-of-plane stiffness. As previously described, the out-of-plane stiffness is an important performance characteristic of the compliant tape guide 20 (FIG. 1) in that it dictates proper edge guidance and positioning of the storage tape 18 (FIG. 1). Thus, if the desired out-of-plane stiffness were not accounted for, while the planar stiffness bodies 190, 192 would "correct" the in-plane resonance problem, an undesired change in the out-of-plane stiffness might also result. Several design alternatives can be utilized to maintain the desired out-of-plane stiffness attribute associated with the prior art compliant member 170 (FIG. 3). For example, the compliant member 58 may be made from a material different than the prior art compliant member 170. Alternatively, the thickness of the compliant member 58 may be reduced relative to the prior art compliant member 170. Because, however, the non-magnetic stainless steel material and extremely small thickness associated with the prior art compliant member 170 are well known in the industry, and the manufacturing techniques essentially perfected, other design changes are preferred. In this regard, in the preferred embodiment, a width of each of the opposing legs 116, 122 has been reduced by an amount proportional to a size of the planar stiffness bodies 190, 192. This feature is best shown by comparison of the opposing legs 178 associated with the prior art compliant member 170 (FIG. 3) and the opposing legs 116, 122 of the compliant member 58 (FIG. 4). Taken in combination, the inclusion of the planar stiffness bodies 190, 192 and proportional reduction in width of the opposing legs 116, 122 results in each of the compliant portions 112, 114 having an increased in-plane stiffness and a virtually identical out-of-plane stiffness in comparison to the compliant portions 174, 176 of the prior art compliant member 170.

Figure 4:
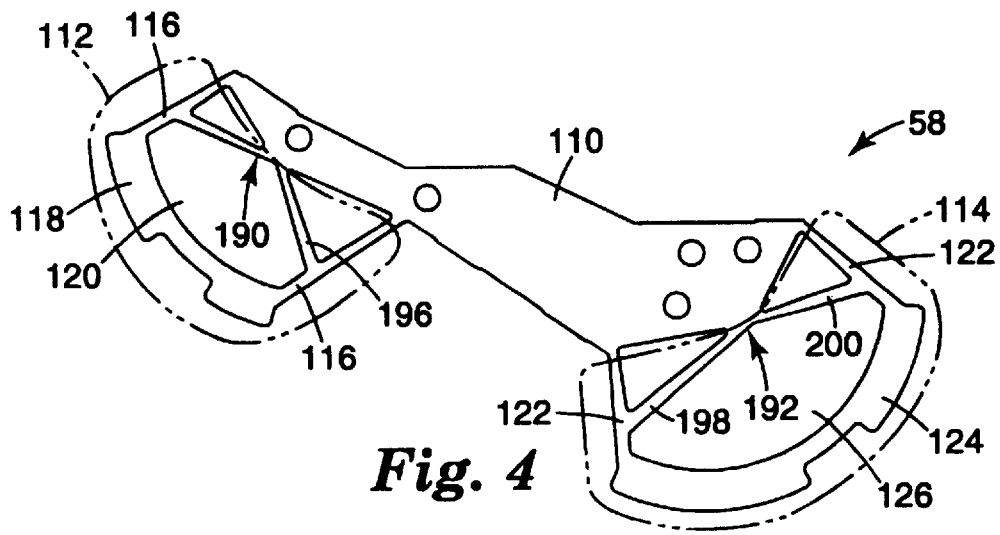
FIG. 4 is an enlarged, top view of a compliant member in accordance with the present invention.
Figure 5:
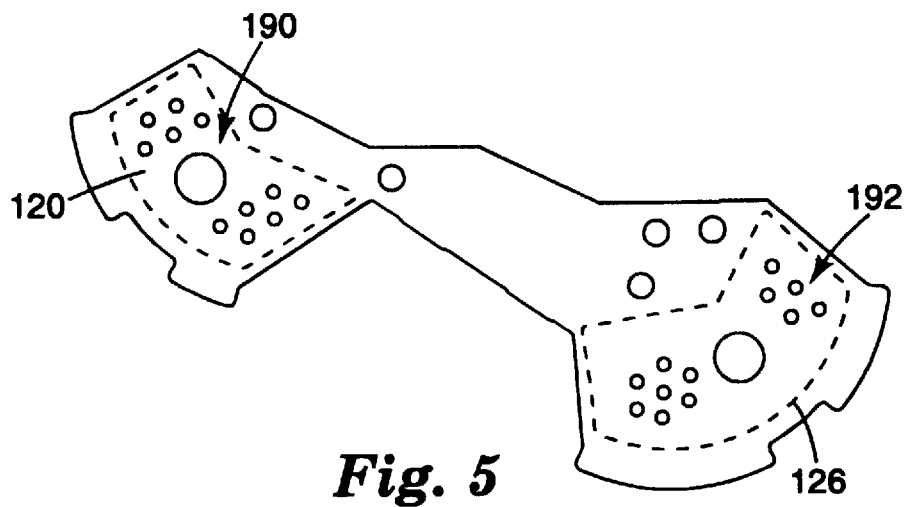
FIG. 5 is an enlarged, top view of a portion of an alternative embodiment compliant member.
Figure 6:
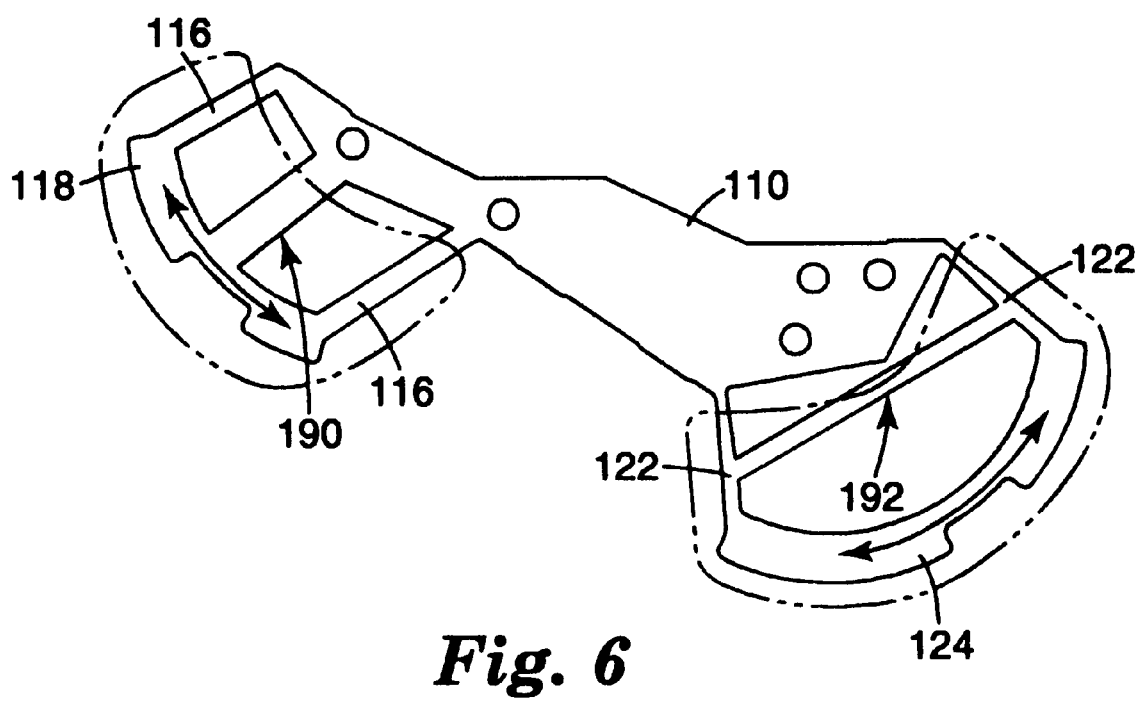
FIG. 6 is an enlarged, top view of an alternative embodiment compliant member in accordance with the present invention.

The symmetrical arms 194, 196, 198, 200 depicted in FIG. 4 is but one example of a planar stiffness body 190, 192 in accordance with the present invention. For example, the planar stiffness body 190 or 192 may be a single arm extending from the base 110 to one of the opposing arms 116, 122. Alternatively, the planar stiffness body 190 or 192 may be an arm or a plurality of arms extending from the base 110 to the edge receiving surface 118, 124; extending from the opposing legs 120, 122 to the edge receiving surface 118, 124; extending between the opposing legs 116, 122; or variations thereof. Even further, the planar stiffness body 190 or 192 may be a perforated plate created within the opening 120, 126 as shown in FIG. 5. Regardless of the exact configuration, the compliant member 58 must be configured such that the in-plane stiffness of respective compliant portion(s) is altered (preferably increased), whereas the predetermined out-of-plane stiffness is maintained.

An additional design consideration is that the planar stiffness body 190 or 192 preferably allow for passage of the pins 24 (FIG. 2) from the bottom support plate 62 (FIG. 2) to the top support plate 50 (FIG. 2). In other words, when the planar stiffness body 190, 192 is created within the respective opening 120, 126, a sufficiently sized passage must remain to allow the pins 24 to mount the compliant tape guide 20 (FIG. 2) to the base plate 12 (FIG. 2).

The compliant member design of the present invention provides an optimized planar stiffness. When incorporated as part of a compliant tape guide, the compliant member retains the desired, or pre-determined, out-of-plane stiffness while increasing the in-plane stiffness. More particularly, the compliant tape guide utilizing the compliant member of the present invention guides and maintains an associated storage tape in a desired plane and at a desired height for accurate reading/writing operations by a tape drive. Additionally, the compliant member of the present invention essentially eliminates tape drive errors caused by in-plane resonance. To this end, one particular application of the present invention relates a method for optimizing performance of a data storage tape cartridge, such as the tape cartridge 10 shown in FIG. 1. In particular, a design analysis is performed on the compliant tape guide, and in particular the compliant member, to determine the frequency at which in-plane resonance will occur. With this value in mind, a determination is made as to whether a particular tape drive has an operating frequency approaching the determined in-plane resonance frequency. Where it is determined, in fact, that operation of the data storage tape cartridge within a particular tape drive will cause compliant member in-plane resonance, the in-plane stiffness of the compliant member is altered, such as by increasing the in-plane stiffness via the planar stiffness body previously described. With this alteration, the data storage tape cartridge will operate within the particular tape drive without in-plane resonance-induced errors.

Although the present invention has been described with reference to preferred embodiments, workers skilled in the art will recognize that changes may be made in form and detail without departing from the spirit and scope of the invention. For example, while the compliant member has been shown as preferably including two compliant portions, the planar stiffness body design of the present invention applies equally as well to a compliant tape guide having single or multiple compliant portions. Additionally, the compliant tape guide of the present invention has been shown as including a biasing member comprising a plurality of fingers. Alternatively, the biasing member may assume a wide variety of forms, including a spring. Further, while the compliant tape guide has been described as preferably including the clamp plate, this component is not a necessary element. The various other components of the compliant tape guide can be assembled, and will perform, without inclusion of the clamp plate.

Finally, the compliant tape guide has been described as preferably forming a portion of a data storage tape cartridge. It should be understood, however, that the compliant tape guide, in accordance with the present invention, may instead be assembled directly within a tape drive. With this configuration, the data storage tape cartridge typically does not include a tape guide. Instead, upon insertion of the data storage tape cartridge into a tape drive, the tape drive operates to direct the storage tape away from the data storage tape cartridge where it is subsequently engaged by a separate tape guidance assembly that includes a compliant tape guide. The in-plane resonance problem previously described may present itself with this configuration. As such, a compliant tape guide in accordance with the present invention is equally useful for tape drive applications.

What is claimed:

1. A compliant tape guide for guiding a storage tape longitudinally through a tape path, the compliant tape guide comprising:

a top support plate;

a bottom support plate;

a bearing piece extending between the top and bottom support plates, the bearing piece defining a tape receiving surface generally perpendicular to the top and bottom support plates for longitudinally guiding a storage tape;

a compliant member adjacent an inner surface of the bottom support plate, the compliant member comprising:

a base, opposing legs extending from the base, an edge receiving surface attached to the opposing legs opposite the base such that an opening is defined between the base, the opposing legs and the edge receiving portion, the edge receiving portion being configured to engage an edge of a storage tape, and a planar stiffness body disposed within the opening, the planar stiffness body configured to substantially increase a stiffness of the edge receiving surface in a plane substantially parallel to a plane of the base; and a biasing member contacting the compliant member for biasing the edge receiving surface into engagement with an edge of a storage tape.

2. The compliant tape guide of claim 1, further comprising:

a clamp plate for securing the compliant member and the biasing member to the bottom support plate.

3. The compliant tape guide of claim 1, wherein the planar stiffness body is configured to limit deflection of the edge receiving surface relative to the base in a plane substantially parallel to a plane of the base.

4. The compliant tape guide of claim 1, wherein the planar stiffness body includes a first arm extending from the base to a first one of the opposing legs.

5. The compliant tape guide of claim 4, wherein the first arm extends centrally from the base.

6. The compliant tape guide of claim 4, wherein the planar stiffness body further includes a second arm extending from the base to a second one of the opposing legs.

7. The compliant tape guide of claim 1, wherein the planar stiffness body includes a first arm extending from the base to the edge receiving surface.

8. The compliant tape guide of claim 7, wherein the planar stiffness body further includes a second arm extending from the base to the edge receiving surface, the second arm being spaced from the first arm.

9. The compliant tape guide of claim 1, wherein the planar stiffness body includes an arm extending between the opposing legs.

10. The compliant tape guide of claim 1, wherein the planar stiffness body is a perforated plate.

11. The compliant tape guide of claim 1, further comprising:
a pin extending between the top support plate and the bottom support plate for securing the compliant tape guide to an auxiliary housing, the planar stiffness body being configured to allow passage of the pin from the bottom support plate to the top support plate.

12. An improved compliant member portion of a compliant tape guide for use with a data storage tape cartridge including a longitudinally driven storage tape, the compliant member including a base, opposing legs extending from a side of the base and an edge receiving surface attached to the opposing legs opposite the base such that an opening is defined between the base, the opposing legs and the edge receiving surface, the compliant member having a predetermined out-of-plane deflection stiffness for controlling deflection of the edge receiving surface relative to the base in a plane substantially perpendicular to a plane of the base, the improvement comprising:
a planar stiffness body disposed within the opening, the planar stiffness body being configured to limit in-plane vibration of the edge receiving surface relative to the base in a plane substantially parallel to a plane of the base, wherein the planar stiffness body is configured to maintain the predetermined out-of-plane deflection stiffness.

13. The improved compliant member of claim 12, wherein the planar stiffness body includes an arm extending from the base to one of the opposing arms.

14. The improved compliant member of claim 12, wherein the planar stiffness body includes an arm extending from the base to the edge receiving surface.

15. The improved compliant member of claim 12, wherein the planar stiffness body includes an arm extending between the opposing legs.

16. The improved compliant member of claim 12, wherein the planar stiffness body includes a perforated plate.

17. The improved compliant member of claim 12, wherein the compliant tape guide further includes a pin extending between the top support plate and the bottom support plate for securing the compliant tape guide within a data storage tape cartridge, the planar stiffness body being configured to allow passage of the pin from the bottom support plate to the top support plate.

18. A method for altering an in-plane stiffness of a compliant member portion of a compliant tape guide for use with a longitudinally driven storage tape, the compliant member including a base, opposing legs extending from a side of the base and a edge receiving surface attached to the opposing legs opposite the base such that an opening is defined between the base, the opposing legs and the edge receiving surface, the compliant member having a predetermined out-of-plane stiffness for directing the edge receiving surface into engagement with an edge of the storage tape upon final assembly of the compliant tape guide, the method including:
disposing a planar stiffness body within the opening, the planar stiffness body configured to alter an in-plane stiffness of the compliant member; and
reducing a dimension of at least one of the opposing legs, the reduction being proportional to a size of the planar stiffness body such that the predetermined out-of-plane stiffness is substantially unchanged.

19. The method of claim 18, wherein the dimension is a width of the at least one of the opposing legs.

20. The method of claim 18, wherein the dimension is a thickness of the at least one of the opposing legs.

21. The method of claim 18, wherein the planar stiffness body includes a first arm connecting a first portion of the compliant member selected from the group consisting of the base, one of the opposing legs and the edge receiving surface to a second portion of the compliant member selected from the group consisting of the base, one of the opposing legs and the edge receiving surface.

22. The method of claim 21, wherein the planar stiffness body further includes a second arm connecting a first portion of the compliant member selected from the group consisting of the base, one of the opposing legs and the edge receiving surface to a second portion of the compliant member selected from the group consisting of the base, one of the opposing legs and the edge receiving surface.

23. The method of claim 18, wherein the planar stiffness body is a perforated plate.

* * * * *